(12) United States Patent
Johnson

(10) Patent No.: US 9,802,660 B2
(45) Date of Patent: Oct. 31, 2017

(54) TORSION AXLE LOCKOUT ASSEMBLY

(71) Applicant: Caterpillar SARL, Geneva (CH)

(72) Inventor: Peter J. Johnson, Cary, NC (US)

(73) Assignee: Caterpillar SARL, Geneva (CH)

( * ) Notice: Subject to any disclaimer, the term of this patent is extended or adjusted under 35 U.S.C. 154(b) by 0 days.

(21) Appl. No.: 15/016,899

(22) Filed: Feb. 5, 2016

(65) Prior Publication Data

US 2017/0225726 A1     Aug. 10, 2017

(51) Int. Cl.
*B62D 55/108*    (2006.01)
*B62D 55/116*    (2006.01)
*B60G 17/005*   (2006.01)
*B60G 11/18*     (2006.01)

(52) U.S. Cl.
CPC .......... *B62D 55/1083* (2013.01); *B60G 11/18* (2013.01); *B60G 17/005* (2013.01); *B62D 55/116* (2013.01)

(58) Field of Classification Search
CPC .......... B62D 55/1083; B62D 55/108; B62D 55/116; B62D 55/104; B62D 55/30; B62D 55/305; B62D 55/0842; B60G 11/18; B60G 11/44; B60G 17/005; B60G 2206/10; B60G 2206/11
See application file for complete search history.

(56) References Cited

U.S. PATENT DOCUMENTS

| | | | | |
|---|---|---|---|---|
| 3,047,283 A | * | 7/1962 | Kivell | B60G 17/06 180/9.6 |
| 3,085,817 A | * | 4/1963 | Krause | B60G 21/0556 192/85.14 |
| 3,262,522 A | * | 7/1966 | Johnson | B60G 17/005 180/9.1 |
| 4,243,247 A | | 1/1981 | Kataoka | |
| 4,917,402 A | * | 4/1990 | Reynolds | B60G 11/185 267/154 |
| 4,919,444 A | | 4/1990 | Leiber et al. | |
| 4,921,231 A | * | 5/1990 | Reynolds | B60G 11/185 16/308 |
| 5,277,450 A | * | 1/1994 | Henschen | B60G 11/183 267/276 |
| 5,411,287 A | * | 5/1995 | Henschen | B60G 11/183 267/276 |
| 6,149,166 A | * | 11/2000 | Struss | B60G 21/055 267/191 |

(Continued)

FOREIGN PATENT DOCUMENTS

| | | |
|---|---|---|
| CN | 101445030 A | 6/2009 |
| DE | 102009054671 A1 | 6/2011 |

*Primary Examiner* — Drew J Brown
*Assistant Examiner* — Timothy Wilhelm
(74) *Attorney, Agent, or Firm* — Leydig, Volt & Mayer, Ltd.

(57) ABSTRACT

A suspension system for supporting a ground engaging member relative to a frame is provided. The suspension system includes a torsion axle assembly including an arm, an axle coupled to the ground engaging member and connected to the arm, a shaft connected to the arm and a tube that is connected to the frame. The tube is configured such that at least a portion of the shaft is received in the tube and supported by the tube for rotation relative to the tube and the frame. A lockout assembly includes a coupling mechanism that is selectively operable to fix the shaft against rotational movement with respect to the tube.

2 Claims, 7 Drawing Sheets

(56) References Cited

U.S. PATENT DOCUMENTS

| | | | |
|---|---|---|---|
| 6,299,259 B1* | 10/2001 | MacKarvich | B60B 35/08 |
| | | | 301/127 |
| 6,454,284 B1 | 9/2002 | Worman, Jr. | |
| 6,601,908 B2* | 8/2003 | Votruba | B62D 63/064 |
| | | | 296/182.1 |
| 6,739,607 B2* | 5/2004 | Eriksson | B60G 7/02 |
| | | | 188/294 |
| 6,805,361 B2* | 10/2004 | Germano | B60G 21/0556 |
| | | | 192/71 |
| 7,726,674 B2* | 6/2010 | VanDenberg | B60G 11/225 |
| | | | 267/189 |
| 7,967,087 B2* | 6/2011 | Arulraja | B62D 55/108 |
| | | | 180/9.46 |
| 8,191,911 B1* | 6/2012 | Reynolds | B60G 3/20 |
| | | | 267/273 |
| 8,360,179 B2 | 1/2013 | Daniels et al. | |
| 8,360,448 B2* | 1/2013 | Lariviere | B60G 11/225 |
| | | | 267/276 |
| 8,794,358 B2* | 8/2014 | Hansen | B62D 55/04 |
| | | | 180/9.21 |
| 9,016,703 B2* | 4/2015 | Rowe | B60G 21/055 |
| | | | 267/273 |
| 9,199,522 B2* | 12/2015 | Beck | B60G 11/225 |
| 2006/0022424 A1* | 2/2006 | Reynolds | B60G 11/183 |
| | | | 280/124.169 |
| 2017/0001672 A1* | 1/2017 | Bodin | B60G 17/005 |

* cited by examiner

TORSION AXLE LOCKOUT ASSEMBLY

TECHNICAL FIELD

This disclosure relates generally to suspension systems and more particularly, to a suspension systems for a machine in which the suspension system is configured as a torsion axle assembly.

BACKGROUND

Compact construction machines, for example compact track loaders, are commonly used in applications where working space is limited. These machines include a frame that may support an engine and work implement, and left and right undercarriages that transfer power from the engine to a ground surface. Some compact construction machines utilize rigid mounting between the frame and the undercarriages. Because of its rigidity, this type of mounting between the frame and the undercarriages can transfer machine-induced loads and vibrations to an operator, making long periods of machine usage uncomfortable for the operator.

To help absorb at least some of these machine induced loads and vibrations, some compact construction machines may include a suspension system in the form of multiple torsion axle assemblies. Each torsion axle assembly may include a torsion arm, a torsion shaft, and an axle. The torsion shaft and the axle may extend in different directions from opposing ends of the torsion arm. The torsion shaft of each torsion axle assembly may be rigidly attached to the frame while the axle is attached to a surface of the undercarriage of the machine.

During operation of the machine, the torsion axle assemblies may flex. In particular, the individual torsion arms may rotate against a cushion of rubber cords located within the torsion shaft. This cushioned rotation absorbs some of the loads and vibrations induced on the undercarriages of the machine during operation, thereby preventing such loads and vibrations from being transferred to the machine frame and the machine operator. However, the operation of the torsion axle assemblies can limit an operator's ability to feel the movement of the machine and the contours of the work surface. This may be an issue during certain working operations in which fine control of the machine may be desired.

SUMMARY

In one aspect, the disclosure describes a suspension system for supporting a ground engaging member relative to a frame. The suspension system includes a torsion axle assembly including an arm, an axle coupled to the ground engaging member and connected to the arm, a shaft connected to the arm and a tube that is connected to the frame. The tube is configured such that at least a portion of the shaft is received in the tube and supported by the tube for rotation relative to the tube and the frame. A lockout assembly includes a coupling mechanism that is selectively operable to fix the shaft against relative rotation with respect to the tube.

In another aspect, the disclosure describes a machine including a ground engaging member, a frame; and a suspension system. The suspension system supports the ground engaging member relative to the frame. The suspension system includes a torsion axle assembly. The torsion axle assembly includes an arm, an axle coupled to the ground engaging member and connected to the arm, a shaft connected to the arm and a tube that is connected to the frame. The tube is configured such that at least a portion of the shaft is received in the tube and supported by the tube for rotation relative to the tube and the frame. A lockout assembly includes a coupling mechanism that is selectively operable to fix the shaft against relative rotation with respect to the tube.

In yet another aspect, the disclosure describes a suspension system for supporting a ground engaging member relative to a frame. The suspension system includes an arm, an axle coupled to the ground engaging member and connected to the arm and a shaft connected to the arm. A tube is connected to the frame. The tube is configured such that at least a portion of the shaft is received in the tube and supported by the tube for rotational movement relative to the tube and the frame. At least one elastomeric member is contained within the tube that is configured and arranged so as to resist movement of the shaft relative to the tube and to generate and apply a return force on a direction opposite the direction of rotational movement of the shaft relative to the tube. A lockout assembly includes a coupling mechanism that is selectively operable to fix the shaft against rotational movement with respect to the tube and an actuating assembly that is configured to direct operation of the coupling mechanism.

DETAILED DESCRIPTION

Figure 1:
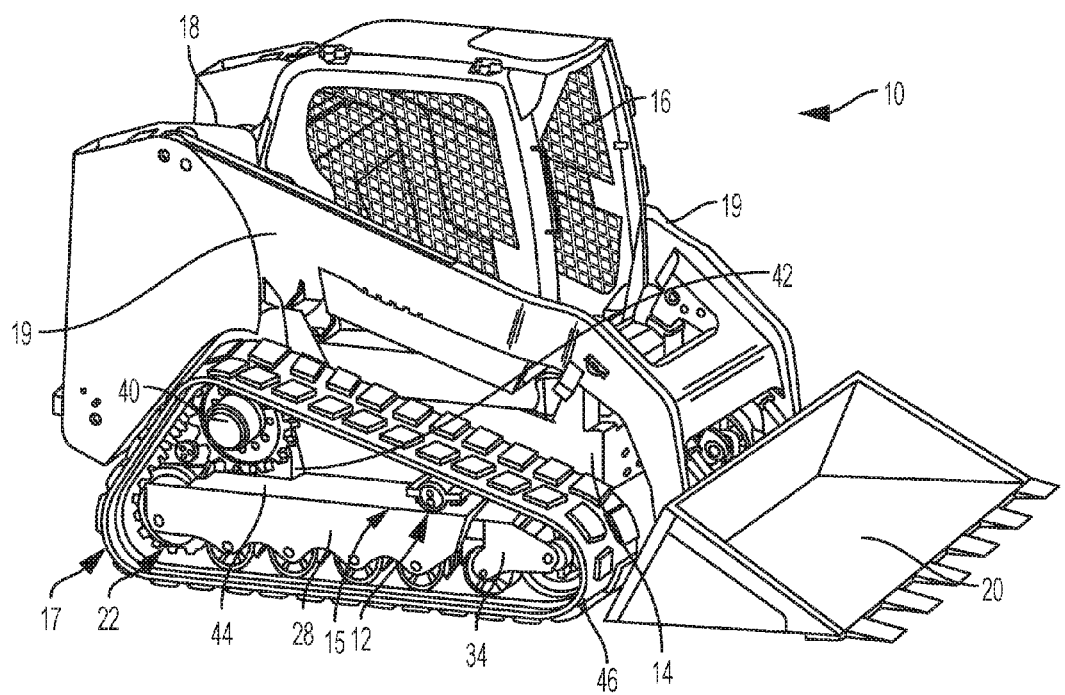
FIG. 1 is an isometric view of an exemplary machine having a suspension system according to the present disclosure.
Figure 2:
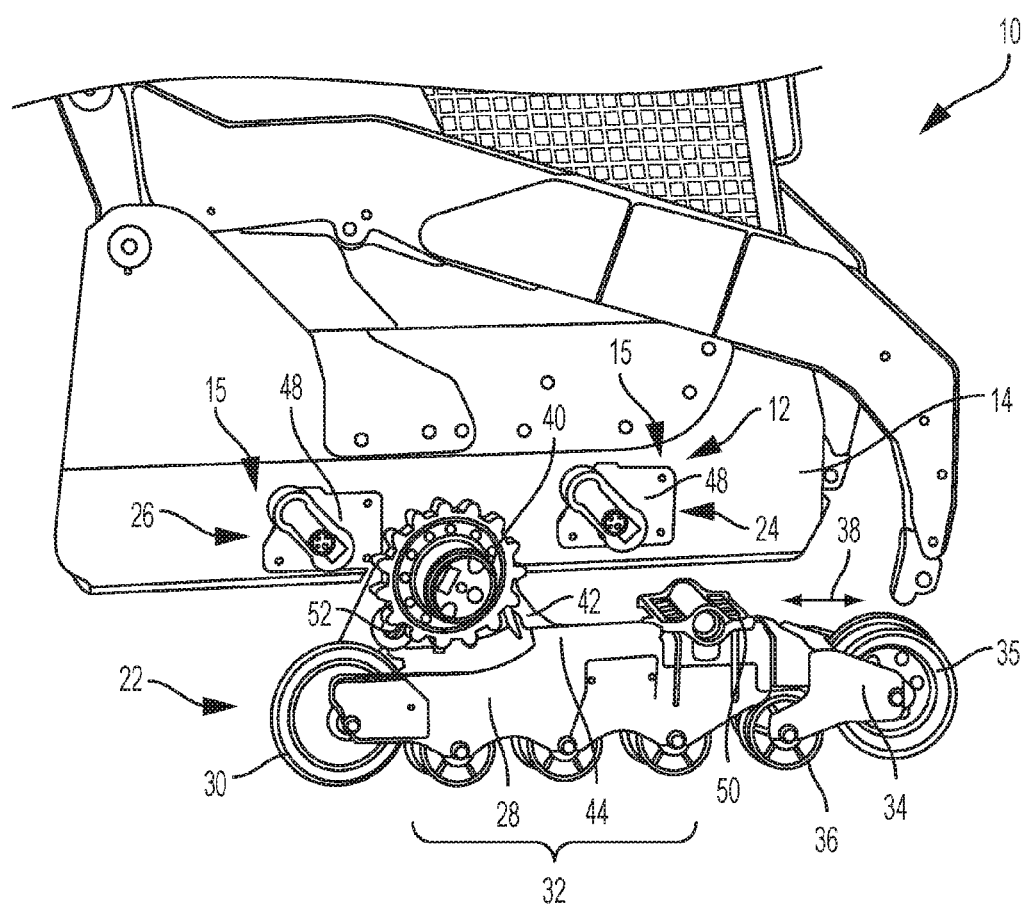
FIG. 2 is an exploded isometric view a portion of the machine of FIG. 1, including components of the undercarriage and suspension system.

This disclosure generally relates to suspension systems for the ground engaging members of mobile machines and in particular suspension systems that consist of one or more torsion axle assemblies. With reference to FIGS. 1 and 2 of the drawings, an exemplary machine 10 in the form of a compact track loader is shown that can include an embodiment of a suspension system 12 that comprises a torsion axle assembly 15 (best shown in FIG. 2) constructed in accordance with principles of the present disclosure. It should be noted, however, that suspension system 12 or torsion axle assembly 15 may be used with other types of machines, if desired. In particular, the present disclosure may be applicable to any type of machine having a torsion axle assembly 15 associated with a ground engaging member 17. The ground engaging members 17 may be tracks or wheels. The present disclosure may also be applicable to vehicles having torsion axle assemblies including, for example, trailers. As used herein, the term machine includes such vehicles. Accordingly, while the present invention is described in connection with a track loader, it should be appreciated that the present disclosure is not limited to use in such a machine.

As shown in FIG. 1, the illustrated machine 10 includes a machine frame 14 and an operator compartment 16. The machine frame 14 may support an engine 18 and a work tool 20 that may be operatively connected to the machine frame 14. The engine 18 may be configured to generate a power output that may be directed to propel the machine 10 and to move the work tool 20. To this end, the machine 10 may include a pair of lift arms 19 pivotally attached to the machine frame 14 in this case behind the operator compartment 16. The operator compartment 16 may include any number and type of input devices used by an operator for control of the drive system, suspension system 12, the engine 18, and/or the work tool 20.

The torsion axle assembly 15 may support the ground engaging members 17 relative to the frame. As shown in FIG. 1, the ground engaging members 17 may include an undercarriage 22 located on each of the opposing sides of the machine 10 (only one side is shown in FIG. 1). Additionally, as shown in FIG. 2, the torsion axle assembly 15 may include front and rear torsion axle assemblies 24, 26 connecting each undercarriage 22 to the machine frame 14.

The illustrated undercarriage 22 includes a rear roller frame 28 having a rear idler 30 and a plurality of rear rollers 32, and a front roller frame 34 having a front idler 35 and a front roller 36. The front roller frame 34 may be operatively connected to the rear roller frame 28 such that the front roller frame 34 moves relative to the rear roller frame 28 in forward and rearward directions as indicated by the arrow 38 in FIG. 2. The front roller frame 34 may be biased away from the rear roller frame 28 via a track recoil system (not shown).

A drive sprocket 40 may be rotatably mounted to the rear roller frame 28 via a projecting member 42 that extends upward from an upper surface 44 of the rear roller frame 28 in a direction away from the rear rollers 32, at an end of the rear roller frame 28 opposite the front roller frame 34. The drive sprocket 40 may be drivingly connected to the engine 18 to drive an endless track 46 (shown in FIG. 1) that encircles the undercarriage 22. Those skilled in the art will appreciate that the undercarriage may have a configuration other than that shown in FIGS. 1 and 2 and described herein.

Figure 3:
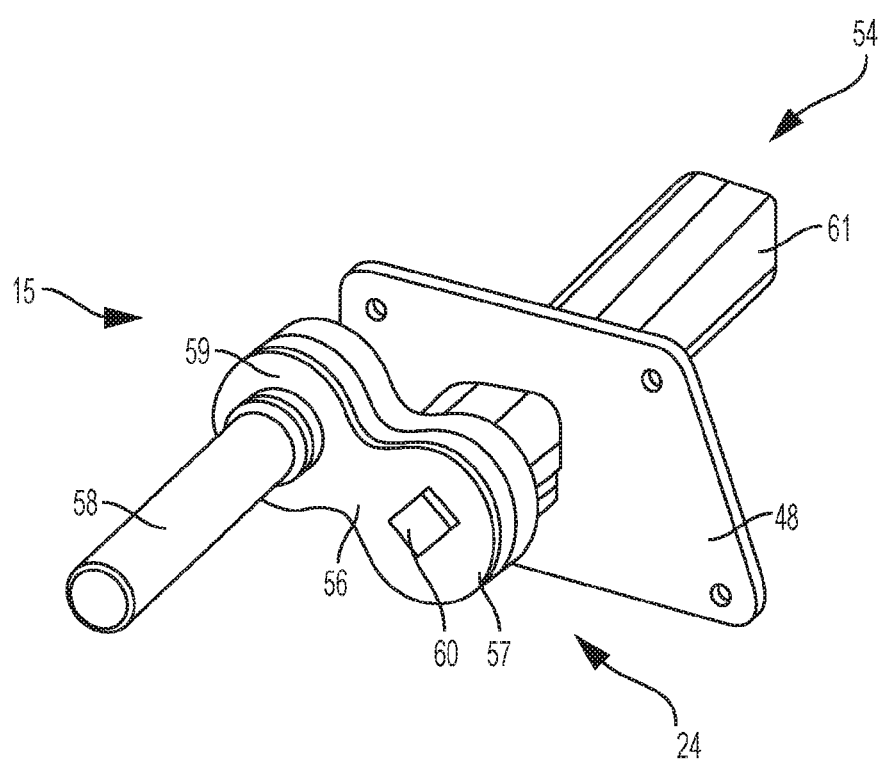
FIG. 3 is an isometric view of a portion of a torsion axle assembly of the suspension system of FIG. 2.

The front and rear torsion axle assemblies 24, 26 may be generally similar and one (i.e., front torsion axle assembly 24) is described with reference to FIG. 3. As shown in FIG. 3, each of the front and rear torsion axle assemblies 24, 26 may include a shaft assembly 54, an arm 56 connected at a first end 57 to the shaft assembly 54, and an axle 58 connected to a second end 59 of the arm 56. The shaft assembly 54 may extend from the arm 56 in a direction generally opposite the direction in which the axle 58 extends. A flange 48 may be fixedly connected to an external surface of the shaft assembly 54, for example by welding or by threaded fasteners.

The shaft assembly 54 may be rigidly connected to the machine frame 14, for example, by way of the flange 48 and suitable fasteners, such as bolts (see FIG. 2). Additionally, the front torsion axle assembly 24 may be mounted to the undercarriage 22 so as to allow sliding movement and rotational movement of the front torsion axle assembly 24 relative to the undercarriage 22. To this end, the undercarriage 22 may include a first bearing 50, such as a sleeve bearing, mounted to the upper surface 44 of the rear roller frame 28 that is configured to slidingly receive the axle 58 of the front torsion axle assembly 24. With this arrangement, the first bearing 50 and thereby the undercarriage 22 may slide in an axial direction of the axle 58 relative to the torsion axle assembly 24 and rotate about the longitudinal axis of the axle 58 relative to the front torsion axle assembly relative 24. A plate (not shown) or other similar retaining component known in the art may be arranged on an end of the front torsion axle assembly 24 at the first bearing 50 to restrict the extent of axial movement of the axle 58 of the front torsion axle assembly 24 relative to the undercarriage 22.

Similar to the front torsion axle assembly 24, the shaft assembly 54 of the rear torsion axle assembly 26 may be rigidly mounted to the machine frame 14 and rotatably and slidably mounted to undercarriage 22. Specifically, the rear torsion axle assembly 26 may be rigidly connected to the frame 14 by way of the flange 48. Moreover, the undercarriage 22 may include a second bearing 52, for example a spherical roller bearing, mounted, in this case, in the projecting member 42 of the rear roller frame 28. The second bearing 52 may be configured to receive the axle 58 of the rear torsion axle assembly 26 in such a manner that allows the axle 58 to slide axially and rotate relative to the second bearing 52. With this arrangement, the second bearing 52 and the undercarriage 22 are capable of is capable of rotating about the longitudinal axis of the axle 58 relative to the rear torsion axle assembly 26 and sliding axially relative to the rear torsion axle assembly 26. Again, a plate (not shown) or other similar retaining component known in the art may be provided on an end of the axle 58 of the rear torsion axle assembly 26 at the second bearing 52 to restrict axial movement of rear torsion axle assembly 26 relative to the undercarriage 22.

Figure 4:
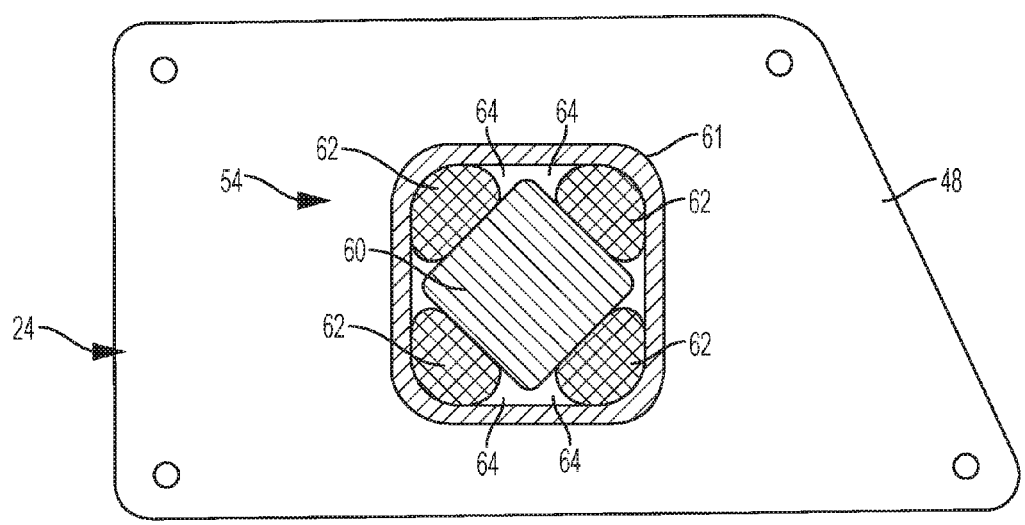
FIG. 4 is a cross-sectional view of the torsion shaft of the torsion axle assembly of FIG. 3.

As shown in FIG. 4, to allow for pivoting movement of the arm 56 relative to the frame 14, the shaft assembly 54 may include an outer tube 61, an inner shaft 60, and elastomeric members 62 positioned in spaces 64 formed between the outer tube 61 and the inner shaft 60. The outer tube 61 and at least a portion of the inner shaft 60, in one embodiment, may both be generally square in cross-sectional profile, although other shapes may also be used. The outer tube 61 may be fixedly attached to the machine frame 14 via the flange 48. As shown in FIG. 3, the inner shaft 60, in turn, may be fixedly connected to the first end 57 of the arm 56 and movably received within the outer tube 61, while the arm 56 may move with respect to the outer tube 61 (i.e., the outer tube 61 is not fixedly connected to the arm 56). According to one embodiment, the arm 56 and axle 58 may be welded together with the inner shaft 60 as a subassembly before the inner shaft 60 is inserted in the outer tube 61. Of course, others methods may be used to assemble these components.

The inner shaft 60 may be positioned such that the corners of the inner shaft 60 are located about midway between the corners of the outer tube 61 (i.e., the inner shaft 60 may be oriented about 45 degrees out of alignment with respect to the outer tube 61) as shown in FIG. 4. As the arm 56 pivots relative to frame 14 during operation of machine 10, the inner shaft 60 may rotate relative to the outer tube 61 to allow the undercarriage 22 to move relative to the machine frame 14. This rotation of the inner shaft 60 causes the corners of the inner shaft 60 to move into spaces 64 and compress the elastomeric members 62. In this manner, the elastomeric members 62 resist and cushion the rotation of the inner shaft 60 and the arm 56 and thereby restrict rotation of the inner shaft 60 relative to the outer tube 61. Moreover, the elastomeric members 62 may generate a return force that is applied on the inner shaft 60 so as to return the inner shaft 60 to its original position (e.g., the position shown in FIG. 4) when the load or force applied on the arm 56 by, for example, the undercarriage 22 is removed. In one exemplary embodiment, the elastomeric members 62 may be cords fabricated from a rubber, vinyl, or plastic material.

Figure 5:
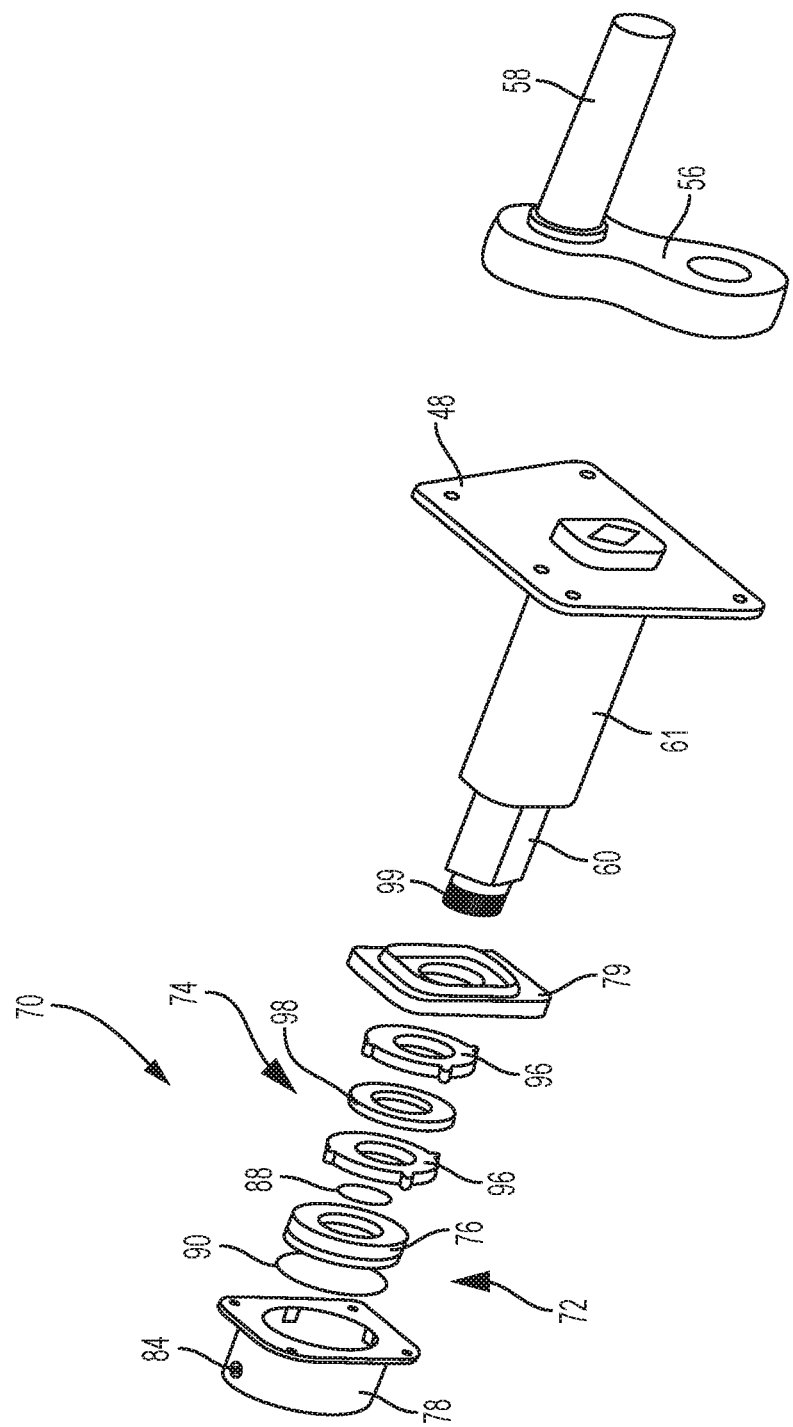
FIG. 5 is an exploded isometric view of the torsion axle assembly of FIG. 3 as well as a lockout assembly.
Figure 6:
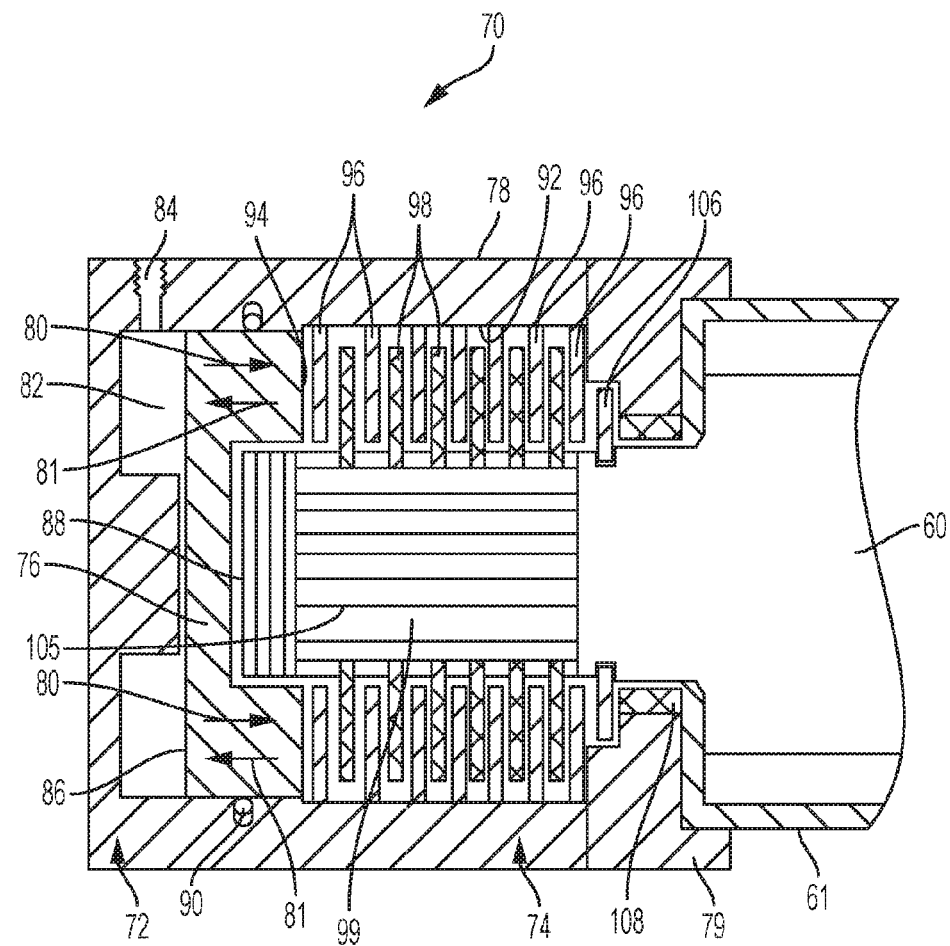
FIG. 6 is a longitudinal section view showing a portion of the torsion axle assembly of FIG. 5 showing the lockout assembly.

To prevent rotation of the inner shaft 60 relative to the outer tube 61 and thereby prevent movement of the undercarriage 22 with respect to the machine frame 14, one or both of the front and rear torsion axle assemblies 24, 26 may be equipped with a selectively engageable lockout assembly 70. With reference to FIGS. 5 and 6, the lockout assembly 70 may be configured such that the inner shaft 60 is selectively fixable relative to the outer tube 61 so as to prevent relative rotation therebetween. To this end, the lockout assembly 70 may include an actuating assembly 72 that controls actuation of a coupling mechanism 74 that is operable to fix or lock the inner shaft 60 relative to the outer tube 61 of the torsion axle assembly 15. According to the illustrated embodiment, this coupling mechanism 74 may comprise a clutch mechanism.

As best shown in FIG. 6, according to one embodiment, the actuating assembly 72 may comprise a piston 76 that is slidably received in a clutch housing 78 for movement relative to the clutch housing 78 between engaged and disengaged positions (e.g., in the directions illustrated by the arrows 80 and 81 in FIG. 6). The clutch housing 78 may include a housing end member 79 that can be secured to the outer tube 61, such as by welding. Movement of the piston 76 from the disengaged to the engaged position may be affected by introduction of pressurized hydraulic fluid into an end chamber 82 in the clutch housing 78 through a fluid inlet 84. More specifically, the pressurized hydraulic fluid may apply a force on a first end 86 of the piston 76 causing the piston 76 to move in the direction 80 towards the clutch mechanism 74 counter to the force of a spring 88. According to one embodiment, the spring 88 may be configured as a coil or wave spring and be arranged between a second end 94 of the piston 76 and a first end portion 99 of the inner shaft 60. To prevent the pressurized fluid in the end chamber 82 from leaking past the piston 76, an o-ring seal 90 may be provided that extends between the outer circumferential surface of the piston 76 and the inside wall 92 of the clutch housing 78.

Sliding axial movement of the inner shaft 60 relative to the clutch housing 78 may be prevented by a snap ring 106 that engages with the housing end member 79. Additionally, a sleeve bearing 108 may be provided between the inner shaft 60 and the housing end member 79 to facilitate rotary movement of the inner shaft 60 relative to the clutch housing 78.

As the piston 76 moves toward an engaged position with respect to the clutch mechanism 74, the second end 94 of the piston 76 may contact and then compress the clutch mechanism 74 causing the clutch mechanism 74 to engage. In particular, the clutch mechanism 74 may include a plurality of reaction plates 96 and friction disks 98 that are arranged in surrounding relation to a first end portion 99 of the inner shaft 60 in a space between the first end portion 99 of the inner shaft 60 and the inside wall 92 of the clutch housing 78 as shown in FIG. 6. The reaction plates 96 and friction disks 98 may each have a generally annular configuration and be arranged in parallel relation to each other and the second end 94 of the piston 76 (note that the number of reaction plates 96 and friction disks 98 visible in the exploded view of FIG. 5 is reduced for the sake of clarity). Moreover, the reaction plates 96 and friction disks 98 may be arranged in a pattern, such as an alternating pattern with each friction disk 98 being arranged between an adjacent pair of reaction plates 96, that facilitates engagement of the inter-engagement of the reaction plates 96 and friction disks 98 when a compressive force is applied on them by the piston 76.

Figure 8:
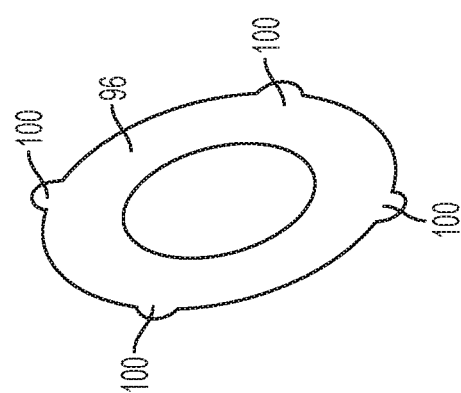
FIG. 8 is an isometric view of a clutch member of the lockout assembly of FIGS. 5 and 6.
Figure 7:
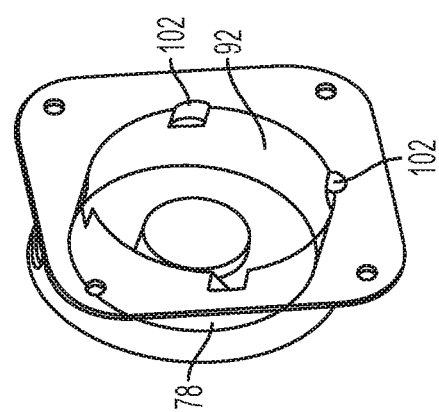
FIG. 7 is an isometric view of a clutch housing of the lockout assembly of FIGS. 5 and 6.

In this case, each reaction plate 96 may include a plurality of radially extending tabs 100 (best shown in FIG. 8) that are received in complementary grooves 102 (best shown in FIG. 7) in the inside wall 92 of the clutch housing 78. The engagement of the tabs 100 with the grooves 102 in the inner wall 92 of the clutch housing 78 prevents rotation of the reaction plates 96 relative to the clutch housing 78.

Figure 9:
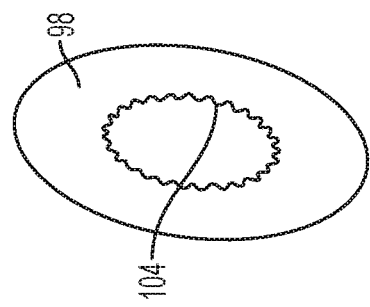
FIG. 9 is an isometric view of a clutch member of the lockout assembly of FIGS. 5 and 6.

Additionally, each friction disk 98 may have a splined inner region 104 (see FIG. 9) that is configured to engage in complementary splines 105 (see FIG. 6) in the first end portion 99 of the inner shaft 60 that is received in the clutch housing 78. The splined engagement of the friction disks 98 with the first end portion 99 of the inner shaft 60 prevents the friction disks 98 from rotating with respect to the inner shaft 60. In other words, the friction disks 98 rotate with the inner shaft 60.

As noted previously, the compressive force applied by the piston 76 on the clutch mechanism 74 as a result of the introduction of hydraulic fluid into the end chamber 82 in the clutch housing 78 moves the reaction plates 96 into engagement with the friction disks 98. The surfaces of the reaction plates 96 and the friction disks 98 that come into contact with each other when the clutch mechanism 74 is engaged may be configured to produce a frictional force that when engaged by the piston 76 is sufficient to prevent rotation of the friction disks 98 relative to the reaction plates 96. Because the reaction plates 96 are fixed from rotation relative to the clutch housing 78 via the tabs 100 and grooves 102 and the inner shaft 60 is fixed from rotation relative to the friction disks 98 via the engagement of the splines 105 and the splined inner region 104 of the friction disks 98, the frictional engagement of the reaction plates 96 and friction disks 98 prevents rotation of the inner shaft 60 relative to the clutch housing 78. Since the clutch housing 78 (in this case, the housing end member 79 thereof) is secured against rotation relative to the outer tube 61, engagement of the clutch mechanism 74 prevents the inner shaft 60 from rotating relative to the outer tube 61.

As will be appreciated by one skilled in the art, the type of friction material used on the reaction plates 96 and friction disks 98 and the size and number of reaction plates 96 and friction disks 98 may vary. For example, using a friction material on the reaction plates 96 and friction disks 98 that has a relatively high coefficient of friction may allow for the size of the plates and disks to be minimized. Similarly, the use of a higher number of reaction plates 96 and friction disks 98 may allow the use of smaller plates and disks. As will be appreciated, the frictional material used, and the number and size of the reaction plates 96 and friction disks 98 may be determined by taking into account many factors, such as the torque generated on the inner shaft during operation of the machine that must be absorbed by the clutch mechanism 74 when the lockout assembly 70 is engaged.

The lockout assembly 70 may be configured so as to disengage when the pressurized hydraulic fluid is drained from the end chamber 82 in the clutch housing 78. For example, the hydraulic fluid may exit the end chamber 82 back through the fluid inlet 84 or via a separate fluid outlet. The draining of the hydraulic fluid may reduce the force applied on the first end 86 of the piston 76 to such a degree that the spring 88 can move the piston 76 in the direction 81 identified in FIG. 6 back to a disengaged position thereby removing the compressive force on the reaction plates 96 and friction disks 98. Removing the compressive force applied by the piston 76 allows the friction disks 98 and thus the inner shaft 60 to again rotate relative to the reaction plates 96 and the clutch housing 78. As a result, the inner shaft 60 can again rotate relative to the outer tube 61 such that the torsion axle assembly 24 or 26 is again operational to provide the suspension system between the frame 12 and the undercarriage 22.

It should be understood that the illustrated actuating assembly 72 and clutch mechanism 74 are just one example of a lockout assembly 70 in accordance with the present disclosure. In particular, the lockout assembly 70 may comprise any type of selectively actuatable mechanism or coupling that can operate to lock the inner shaft 60 from rotation with respect to the outer tube 61. For example, while the illustrated clutch mechanism 74 is a dry clutch mechanism, a wet clutch mechanism that includes a lubricant material in the area of the reaction plates and friction disks could also be used. Mechanisms other than clutches could also be used. While the illustrated embodiment uses a hydraulically powered actuating assembly to control engagement of the lockout assembly, other types of actuation assemblies could also be used such as mechanically powered and electrically powered actuation assemblies could also be used. For example, an actuating assembly having a mechanical mechanism, such as a cable actuated cam lever system similar to that used to actuate many automotive parking brakes, could be used drive movement of the piston. While a hydraulically actuated actuating assembly can offer fast response and smooth engagement and can utilize the hydraulic fluid system already present on many machines, a mechanically actuated system such a cable actuated cam lever system may be used in application in which a hydraulic system is not already available.

The actuation of the lockout assembly 70 may be controlled in any suitable manner. For example, a manual control could be provided in the operator compartment 16 that would allow the operator of the machine to engage the lockout assembly 70 when desired. In one embodiment, such a control could be configured to allow the operator to selectively control the flow of hydraulic fluid to and from the end chamber 82 in the clutch housing 78 and thereby movement of the piston 76. Alternatively or additionally, a control system could be provided that could engage and disengage the lockout assembly automatically during certain operating conditions of the vehicle.

INDUSTRIAL APPLICABILITY

The torsion axle lockout assembly of the present disclosure is applicable to any type of suspension system that utilizes a torsion axle assembly. In particular, the present disclosure can be applicable to any machine, such as compact track loaders and trailers, having a torsion axle assembly to suspend a ground engaging member with respect to a machine frame in which it would be desirable to occasionally lock out the torsion axle assembly. For example, when using a compact track loader in some working scenarios, such as fine grading or dozing operations, an operator may desire to lockout the torsion axle assembly. This may provide an enhanced feel of the movement of the machine and the contours of the work surface which may lead to better control of the work implement on the machine. The torsion axle lockout assembly of the present disclosure allows the operator to selectively lock out the torsion axle assembly in such working scenarios or in any other situation in which operation of the torsion axle assembly is not desired.

Additionally, some operators may prefer the feel of the machine without the torsion axle assembly during all working conditions. In such circumstances, the operator can selectively lock out the torsion axle assembly with the lockout assembly prior to beginning a work cycle. The lockout assembly of the present disclosure can accommodate such a preference and eliminates the need, for example, for a worksite to have separate machines on hand that do not include torsion axle assemblies for use by operators that prefer to not have a torsion axle assembly.

This disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. A suspension system for supporting a ground engaging member relative to a frame comprising:
   a torsion axle assembly including an arm, an axle configured to be coupled to the ground engaging member and connected to the arm, a shaft connected to the arm and a tube that is configured to be connected to the frame, the tube being configured such that at least a portion of the shaft is received in the tube and supported by the tube for rotational movement relative to the tube and the frame; and
   a lockout assembly comprising a coupling mechanism that is selectively operable to fix the shaft against rotational movement with respect to the tube, the lockout assembly further including an actuating assembly that is configured to direct operation of the coupling mechanism between an engaged position in which the coupling mechanism fixes the shaft against relative movement with respect to the tube and a disengaged position in which the shaft is free to rotate with respect to the tube,
   wherein the coupling mechanism comprises a clutch mechanism,
   wherein the actuating assembly is powered by pressurized hydraulic fluid and includes a piston that moves into engagement with the clutch mechanism in response to exposing a first end of the piston to the pressurized hydraulic fluid,
   wherein the piston and clutch mechanism are contained within a clutch housing that is fixed in rotation relative to the tube, the clutch housing being secured to a distal end of the tube opposite the arm and enclosing a distal end of the shaft, the clutch mechanism including at least one reaction plate and at least one friction plate, the at least one reaction plate being secured to the clutch housing so as to be fixed in rotation with respect to the clutch housing, and the at least one friction plate being secured to the distal end of the shaft so as to be fixed in rotation with respect to the shaft,
   wherein the tube contains at least one elastomeric member that is configured and arranged so as to resist movement of the shaft relative to the tube and to generate and apply a return force on a direction opposite the direction of movement of the shaft relative to the tube.

2. A machine comprising:
a ground engaging member;
a frame;
a suspension system that supports the ground engaging member relative to the frame, the suspension system comprising a torsion axle assembly including an arm, an axle coupled to the ground engaging member and connected to the arm, a shaft connected to the arm and a tube that is connected to the frame, the tube being configured such that at least a portion of the shaft is received in the tube and supported by the tube for rotational movement relative to the tube and the frame; and
a lockout assembly comprising a coupling mechanism that is selectively operable to fix the shaft against rotational movement with respect to the tube, the lockout assembly further including an actuating assembly that is configured to direct operation of the coupling mechanism between an engaged position in which the coupling mechanism fixes the shaft against relative movement with respect to the tube and a disengaged position in which the shaft is free to rotate with respect to the tube,
wherein the coupling mechanism comprises a clutch mechanism,
wherein the actuating assembly is powered by pressurized hydraulic fluid and includes a piston that moves into engagement with the clutch mechanism in response to exposing a first end of the piston to the pressurized hydraulic fluid,
wherein the piston and clutch mechanism are contained within a clutch housing that is fixed in rotation relative to the tube, the clutch housing being secured to a distal end of the tube opposite the arm and enclosing a distal end of the shaft, the clutch mechanism including at least one reaction plate and at least one friction plate, the at least one reaction plate being secured to the clutch housing so as to be fixed in rotation with respect to the clutch housing, and the at least one friction plate being secured to the distal end of the shaft so as to be fixed in rotation with respect to the shaft,
wherein the tube contains at least one elastomeric member that is configured and arranged so as to resist movement of the shaft relative to the tube and to generate and apply a return force on a direction opposite the direction of movement of the shaft relative to the tube.

* * * * *